(12) United States Patent
Knee et al.

(10) Patent No.: US 7,215,830 B2
(45) Date of Patent: May 8, 2007

(54) METHOD AND DEVICE FOR TRANSFORMING AN OBJECT IMAGE

(75) Inventors: Werner Knee, Esslingen (DE); Uwe Beutnagel-Buchner, Stuttgart (DE); Axel Kirschbaum, Muehlacker (DE); Markus Lindner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 828 days.

(21) Appl. No.: 10/351,038

(22) Filed: Jan. 24, 2003

(65) Prior Publication Data

US 2003/0151614 A1    Aug. 14, 2003

(30) Foreign Application Priority Data

Jan. 24, 2002    (DE) ................. 102 02 602

(51) Int. Cl.
*G06K 9/32*    (2006.01)
(52) U.S. Cl. .............. 382/293; 382/282; 382/295; 358/538; 358/453
(58) Field of Classification Search ............... 382/277, 382/278, 284, 296, 300, 282, 293, 295; 358/1.2, 358/538, 453
See application file for complete search history.

(56) References Cited

U.S. PATENT DOCUMENTS

| | | | | |
|---|---|---|---|---|
| 5,228,098 A | * | 7/1993 | Crinon et al. ............. | 382/240 |
| 5,319,793 A | * | 6/1994 | Hancock et al. ........... | 345/602 |
| 5,353,355 A | * | 10/1994 | Takagi et al. ............. | 382/111 |
| 5,392,072 A | * | 2/1995 | Rodriguez et al. ......... | 375/240.03 |
| 5,585,944 A | * | 12/1996 | Rodriguez ................. | 358/500 |
| 5,686,960 A | | 11/1997 | Sussman et al. | |
| 6,280,341 B1 | * | 8/2001 | Hayashi .................... | 472/61 |
| 6,433,851 B2 | * | 8/2002 | Shimada et al. ........... | 349/138 |
| 6,669,346 B2 | * | 12/2003 | Metcalf .................... | 353/94 |
| 6,990,249 B2 | * | 1/2006 | Nomura .................... | 382/254 |

FOREIGN PATENT DOCUMENTS

DE    198 16 795    10/1999

OTHER PUBLICATIONS

Heckbert, P. "Survey of Texture Mapping," IEEE Computer Graphics and Applications, Nov. 1, 1986, pp. 56-87, vol. 6, No. 11, IEEE Inc. New York, US.

Eldon, J. et al., "Using the TMC2301 Image Resampling Squencer," Microprocessors and Microsystems, Mar. 1, 1990, pp. 107-118, IPC Business Press Ltd. London, GB.

(Continued)

*Primary Examiner*—Samir Ahmed
*Assistant Examiner*—Yosef Kassa
(74) *Attorney, Agent, or Firm*—Kenyon & Kenyon LLP

(57) ABSTRACT

The present invention relates to a method and a device for transforming an object image, e.g., using a rotation and/or scaling, for showing it on a display unit having a matrix-shaped array of target image points. In order to achieve a rapid and exact representation of the rotated object at relatively low expenditure, the present invention provides, for at least a portion of the target image points, determining source image points by an inverse transformation, and comparing the source image points to pre-stored object image points. From this comparison, the target image point data of the target image points are ascertained. Furthermore, a suitable image of such a transformation is created.

46 Claims, 8 Drawing Sheets

OTHER PUBLICATIONS

Eldon, J. et al., "Image-Resampling Sequencer Speeds Graphics System Design" Electronic Design, Jun. 11, 1987, pp. 129-132, 134, 138, Penton Publishing, Cleveland, OH, US.

Siegel S. "Realtime Polynomials Warp Hardware for Arbitrary Resolution Image Resampling." Electronic Imaging '88, International Electronic Imaging Eyposition and Conference, Mar. 28, 1988, pp. 394-399, Advance Printing of Paper Summaries, Waltham, MA, US.

Wolberg, G "Spatial Transformations," Digital Image Warping, IEEE Computer Society Press, 1990, pp. 41-51, 163-187, Los Alamitso, CA, US.

* cited by examiner

METHOD AND DEVICE FOR TRANSFORMING AN OBJECT IMAGE

FIELD OF THE INVENTION

The present invention relates to a method and a device for transforming, in particular rotating and/or scaling, an image of an object for showing the image on a display unit having a matrix-shaped array of target image points.

BACKGROUND INFORMATION

Transformation of images may be achieved by a rotation and/or scaling, i.e., an extension or stretching, of an image of an object stored as a pixel database or a pixel map. Such methods are used in graphics programs for rotating images of an object through any desired angle and for scaling them in the x direction and/or the y direction. They are used especially for representing a pointer, symbols or a map on a matrix-shaped indicator device of a motor vehicle, e.g. an LCD display.

A pointer is generally displayed on the display unit of a motor vehicle with respect to an angle of rotation, which depends on a parameter of a driving state variable, such as vehicle speed, engine speed, fuel tank content or a temperature. In this context, the image of the object of the pointer to be rotated may generally be formed in color and have different transparencies for reproduction in front of a background image, so that to each image point of the target image a plurality of image point data has to be assigned, such as the primary colors red (hereinafter represented as R), yellow (hereinafter represented as G) and blue (hereinafter represented as B) and possibly also a transparency value α, or YUV and possibly α. In navigational systems, prestored map data are scaled for adjusting to the size or pixel number of the display device, and the indicated road map is partially aligned continuously by extension in the travel direction such that the vertical direction of the display unit corresponds to the direction of travel. In addition, a compass indication may also be represented in the image.

Furthermore, in graphics applications, for example, scanned-in images may be aligned as a rectangle, images may be rotated before being printed, for the optimum use of the format of the paper, and graphics symbols may be placed in CAD programs, such as during the planning of furnishing a home.

Regarding rotation and/or scaling of images and objects, fundamental differences are made between methods that are pixel-oriented and vector-oriented. Both methods may be imaged in hardware, software or a mixture of the two.

An image of a method in a hardware implementation is defined by an algorithm that is permanently wired on a chip, as a rule, in the graphics controller. This hardware block awaits agreed-upon parameters in the source data, processes these, and makes the result available again, for example, in a memory region. Thus, algorithms in hardware only have to be supplied with few data and work out the wired problem very rapidly. The algortihm itself, however, may no longer be changed.

An image in a software implementation is performed, for instance, on a usual computing device, such as a personal computer. A microprocessor receives instructions from a software program. The software program includes an algorithm, and processes the instructions with the aid of the microprocessor and associated peripheral units. An algorithm in software is very flexible because of the ease of making changes, but the software algorithm runs slower than the hardware algorithm because of the purely sequential processing method of the microprocessor.

Furthermore, for example, in personal computers having an efficient graphics board for game applications, combined systems are used in which the software takes over the extension of the vector data, but the drawing of the new image is implemented by a hardware block in the graphics controller. This solution combines the flexibility of the software with the speed of hardware imaging. In this context, for instance, a graphics controller, a microprocessor, a program memory and a working memory may be connected via a bus system. The software for a microprocessor and all the required graphics data, including the source pixel image, are stored in the program memory. The working memory is used by the microprocessor and the graphics controller, when needed, as temporary memory, and includes an image refresh memory, on which the target image to be shown on the display unit is stored. The image stored in the image refresh memory is cyclically read out by the graphics controller, for instance, 60 times per second, and sent to the display unit.

In pixel-oriented methods, the object image is described as a pixel map graphic. In the extension and/or scaling of pixel map graphics, each individual pixel of the object image is computed anew by an algorithm. In the case of a continuous adjustment of the object image to a changeable angle of rotation, such computing in real time during a software implementation leads to great computing effort. Implementations using hardware are not used, especially in the automotive field. In order to represent, for example, rotary pointers, for each possible pointer position an image having target image point data may be computed in advance and stored. Thus, for each pointer position, only the image point data of the image have to be called up and represented. It is a disadvantage in such a method wherein, particularly in case of higher resolution and colored, transparent representations, considerable storage space is required.

In vector-oriented methods, the object image is described by vectors stored beforehand. The rotation and/or scaling of the vector graphics is accomplished by the recalculation of the individual vectors followed by redrawing of the image. In this context, a pointer is described, for example, by a pointer contour. To show the pointer, the vectors are rotated in real time at their respective angle of rotation.

Since in this method only the vectors of the pointer contour are stored, the required storage space is low. In the continuous representation of the pointer, only the transformation of the vectors as a function of a parameter has to be calculated, so that the computing effort is also limited. However, using such methods generally only allow description of simpler representations of a pointer, since in particular costlier shape formations and pointer representations, having several color shades and transparency values, either require a large number of vectors or a description of each image point by its own vector. In the case of a software implementation, this leads to a computing effort that may in practice not be able to be carried out in real time, so that, at all events, costly hardware implementations are used.

German Published Patent Application No. 198 16 795 describes a method for representing moved objects in pixel map format on a matrix-shaped display device in which, for various object representations of a predetermined path line, pixel maps are in each case calculated in advance and stored, and the respective positioning of the object along the path line is performed by reading and display of the pixel maps as well as the computing of a temporary pixel map, if necessary, by interpolation from the image point data of the prestored pixel maps. Thus the methods described above, of storage of all image point data as well as the computation of each target image based on a prestored object image are combined. However, this has the disadvantage that either a large number of pointer illustrations has to be prestored, using the corresponding storage space, or the quality of the illustration is visibly impaired during the interpolation.

SUMMARY

By contrast, the method and device of the present invention require relatively little hardware expenditure, in particular a low memory requirement and a small-dimensioned computing unit. A relatively low computing cost, an accurate representation of an image of an object having undergone any desired angle of transformation, especially any rotation, is possible. Furthermore, an efficient imaging of a transformation is created in hardware and software, which especially includes a rotation and/or scaling and/or translation.

In this connection, a user will understand the coordinates by an image point, or rather the coordinate pair $x_i$, $y_i$ of the image point, in contrast to which the data assigned to the image point, such as the chromaticity value and the transparency, are called image point data.

Thus, according to the present invention, in contrast to the method described at the outset, target image points are used. At least a part of the target image points, i.e. the x, y coordinates given by their column and row number, are inversely transformed, whereby the corresponding source image points, i.e. x, y coordinates in the source image, are ascertained. In a transformation having a rotation and/or a scaling, the respective inverse transformation is the rotation about the negative angle of rotation and/or a scaling about the reciprocal values of the scaling factors of the x, y direction, which may be represented by a suitable matrix. In general, the rotation matrix has a negative angle of rotation and the reciprocal values of the scaling factors. The source image points are determined wherein, in most cases, the source image points have non-integer x, y coordinate values and do not coincide with any of the object image points. The data of a target image point are now determined from a comparison of s source image point to the prestored object image points of the object image.

Thus, since the object image to be transformed is described by individual image points, i.e. is stored as a pixel image, more complex configurations having several tints and transparency values may be stored in a pixel database. Inasmuch as only one object image, i.e. especially at an angle of rotation of zero and a scaling factor of one, is stored, very little memory space is required even for more complex designs, color variations and transparency values. In this way, according to the present invention, the representation of monochrome or colored images, and images having transparency values or not having them, is possible.

By a comparison of the coordinates of the ascertained source image point to minimum and maximum values, it may be determined whether a source image point falls within the object image, and thus its data may subsequently be determined, or whether the source image point falls outside the object image, and is therefore not relevant. If the comparison determines no relevancy, a possibly present transparency value is set to zero or, if no transparency value is present, a brightness value and/or chromaticity value is adjusted to the background image.

If the ascertained source image point and its coordinates fall exactly on an object image point, its image point data may be taken directly as the R, G, B, □-values. Otherwise, one may perform averaging over the corresponding image point data of the four surrounding object image points. For this purpose, one may use particularly linear averaging, in which the weighting of the image point data of each object point is proportional to the distance of its coordinates from the coordinates (i.e. column number and row number) of the source image point. Such a weighting is particularly suitable for the transformation in an integrated circuit (IC, e.g. also an ASIC (application specific integrated circuit)). In such an averaging, the antialiasing of the object image is kept essentially intact, generally by a stepwise change of the transparency value at the edge of the object image, so that good representations of the transformed object may be achieved even without subsequent filtering of the transformed object image.

According to the present invention, the computing costs and configuration of the inverse transformation, particularly a reverse rotation of the target image point, may be reduced even more by making a comparison of the target image points to the target image, even before determining the source image points, within which target image lie the target image points relevant for the representation of the rotated object. For this purpose, for example, corner image points of the object image may be transformed with minimum and maximum coordinate values, e.g. rotated by the positive angle of rotation, thus forming corresponding corner image points of the target image. Thus, in this specific embodiment, a comparison is made in the target image, and not in the source image. By doing this, the later computing configuration and costs of the inverse transformation of the target image points may be substantially reduced by the relatively low computing use of the transformation of four object image points. In both specific embodiments a possibly present transparency value is set to zero, or the brightness value and/or the chromaticity value is adjusted to the background image.

In order to achieve sufficiently sharp illustrations of the rotated object in the case of larger scaling factors or greater ranges of the scaling factor, several object images of the same object may also be used, for instance, using different resolutions.

Furthermore, the object image may also be stored having a higher local resolution compared to the target image of the display unit. Such a supersampling requires essentially only a higher memory requirement for the object image having the respective image point data. The computing use for the reverse transformation of the target image points and the averaging of their data from the object image point data is independent of the number of the stored object image point data, so that the overall computing expenditure is not increased in such a supersampling.

The object image may also be subdivided into several segments which are each individually transformed. By doing this, the target image range to be computed may be held low, especially for the rotation of an elongated object image, such as a pointer. In this case, first of all, for the segments of the object image, target segment vertex points are determined, in the manner described above, by transformation of their object segment vertex points. Subsequently, according to one alternative, the edges, which run through these target segment vertex points, may be parameterized as straight lines and the target image points may be ascertained within the edges as target image points. According to a second alternative exemplary embodiment, a target segment range may be picked to be a polygon comprising these target segment points, particularly a vertically/horizontally aligned rectangle, which has target image points that are subsequently inversely transformed.

The device according to the present invention may in particular be implemented by having an IC, such as an ASIC, for the linear averaging of the target image point data, which allows cost-effective production and high computing speed.

According to another exemplary embodiment, an implementation may be carried out that is largely hardware-based and is yet relatively cost-effective, in that the transformations and interpolations are performed by a hardware filtering device of a graphics controller, wherein the segments of the object image to be transformed are loaded into an input cache memory and the target segment ranges calculated by transformation are loaded into an output cache memory of the graphics controller, the graphics controller and possibly the microprocessor used for program control being integrated.

DETAILED DESCRIPTION

Figure 1:
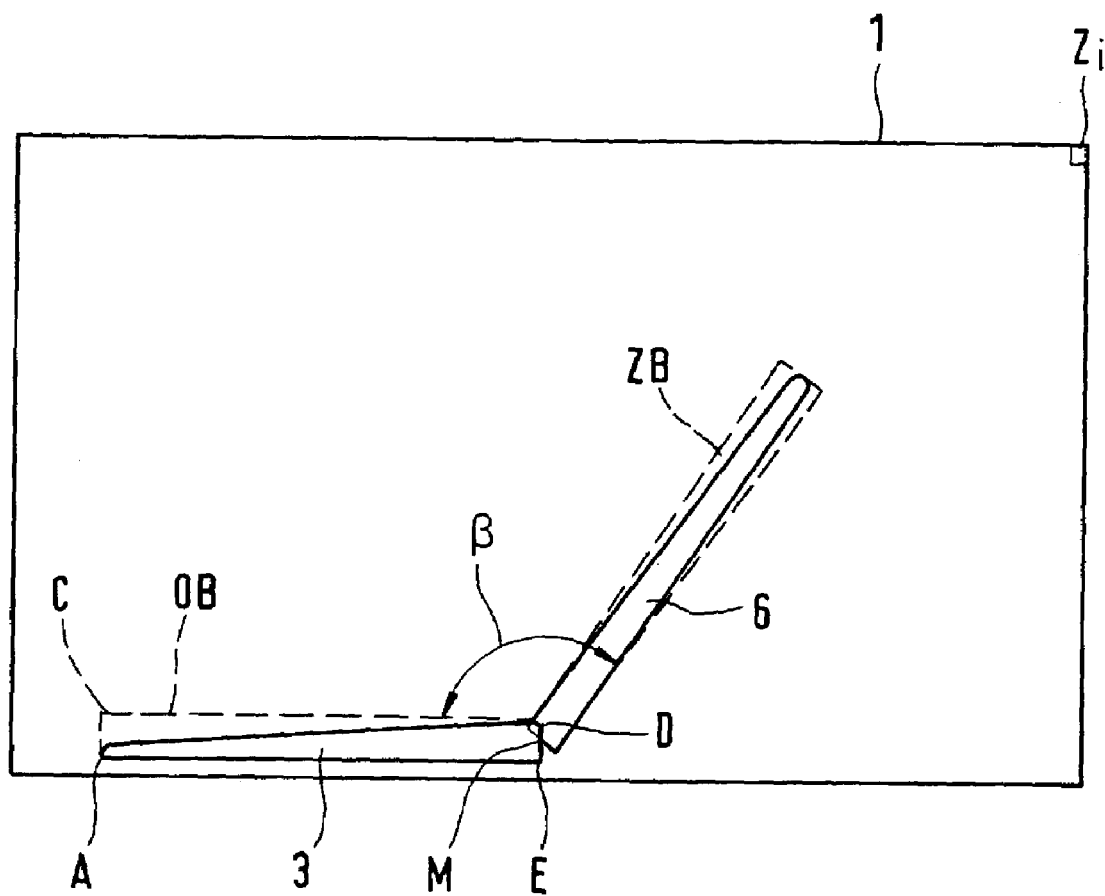
FIG. 1 is an illustration of a display unit having an object image and a target image.

According to FIG. 1, an LCD display 1 having a matrix-shaped placement of pixels or image points $Z_i$ is provided, where i=1 to n. On LCD display 1 an indicator is illustrated at different angles of rotation $\beta$, the angle of rotation $\beta$ corresponding to a parameter, such as vehicle speed or engine speed. In FIG. 1 a pointer 3 is illustrated in the basic setting ($\beta=0$) in an object image OB represented by broken lines, and a pointer 6 is illustrated, rotated about an angle of rotation $\beta$ in a target image ZB. The object image OB and the target image ZB are described by pixel map files, the image point data described by a row number and column number being stored for each image, so that the target image ZB may be reproduced having a variable coloring and possibly a transparency in front of a background such as a scaling or further displays. In the specific embodiments illustrated, the basic colors R, G, B and perhaps a transparency value $\alpha$ are used, but other alternative color formats, such as YUV and, if necessary, $\alpha$ may also be used. The column and row numbers are regarded below as (integral) x,y coordinates. Thus, to represent the target image ZB, the corresponding target image point data $R_i$, $G_i$, $B_i$, $\square_i$ have to be ascertained from the known image point data $R_k$, $G_k$, $B_k$, $\alpha_k$ of the object image points $O_k$ and the known angle of rotation $\beta$.

Figure 2:
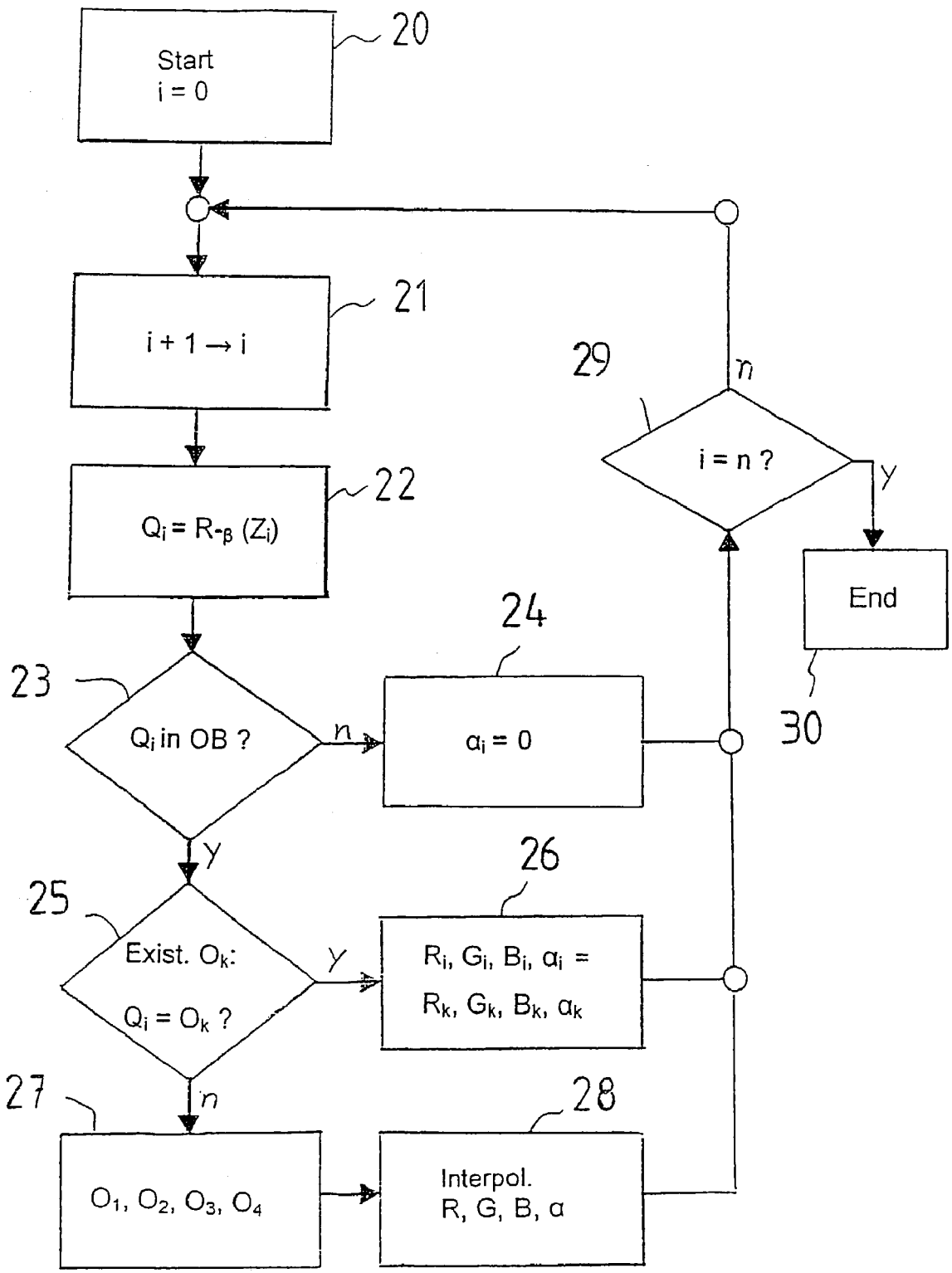
FIG. 2 is a flow diagram of a method according to one exemplary embodiment of the present invention.

To do this, according to the method illustrated in FIG. 2, in a first method step 20, upon input of an angle of rotation $\beta$, or the presence of a changed angle of rotation $\beta$, the computation of the new target image points is initiated, and a parameter i is set to zero. In the loop formed by second method step 21 and decision step 29, the target image points $Z_i$, for i=1 to n, are called up one after another by their x and y coordinates, and subsequently, in a third method step 22, are rotated about a negative angle of rotation $-\beta$ with the aid of a rotation matrix $R_{-\beta}$. Thereby the x and y coordinates of the source image point $Q_i$ are determined. In decision step 23 it is tested whether the determined source image point lies within the object image OB. The rectangular object image OB illustrated in FIG. 1 is simply fixed by minimum and maximum x and y coordinates, so that, for this comparison, only the x and y coordinates of the ascertained source image point $Q_i$ has to be compared with these values. If source image point $Q_i$ does not lie within object image OB, it is not represented. In this case, for the representation having a transparency value, according to step 24, it is set to zero so that the corresponding target image point $Z_i$ is not recognized on LCD display 2. If no transparent representation is possible, and thus no transparency value is to be established, alternatively the chromaticities R, G, B (in a monochrome representation, similarly, the brightness value) may be adjusted to the background image. In steps 29, 30 and 21 the method is subsequently terminated, or the next target image point $Z_{i+1}$ is taken.

If it is determined in decision step 23 that resource image point $Q_i$ lies within object image OB, then in next decision step 25 it is first checked whether the determined source image point $Q_i$ falls exactly on a prestored object image point $O_k$, i.e. whether its x and y coordinates coincide with it. In this case, in step 26, image point data $R_k$, $G_k$, $B_k$, $\square_k$ of object image point $O_k$ are used directly as image point data $R_i$, $G_i$, $B_i$, $\square_i$ of corresponding target image point $Z_i$, and in steps 21, 29, in turn, the next target image point Zsubi+1 is taken into consideration, or the method is terminated. If source image point $Q_i$ lies between the predefined object image points, in step 27 first the adjacent object image points, denoted as $O_1$, $O_2$, $O_3$, $O_4$ for simplicity's sake, are determined. In step 28, image point data $R_i$, $G_i$, $B_i$, $\square_i$ are interpolated from the corresponding image point data of these adjacent object image points.

Figure 6:
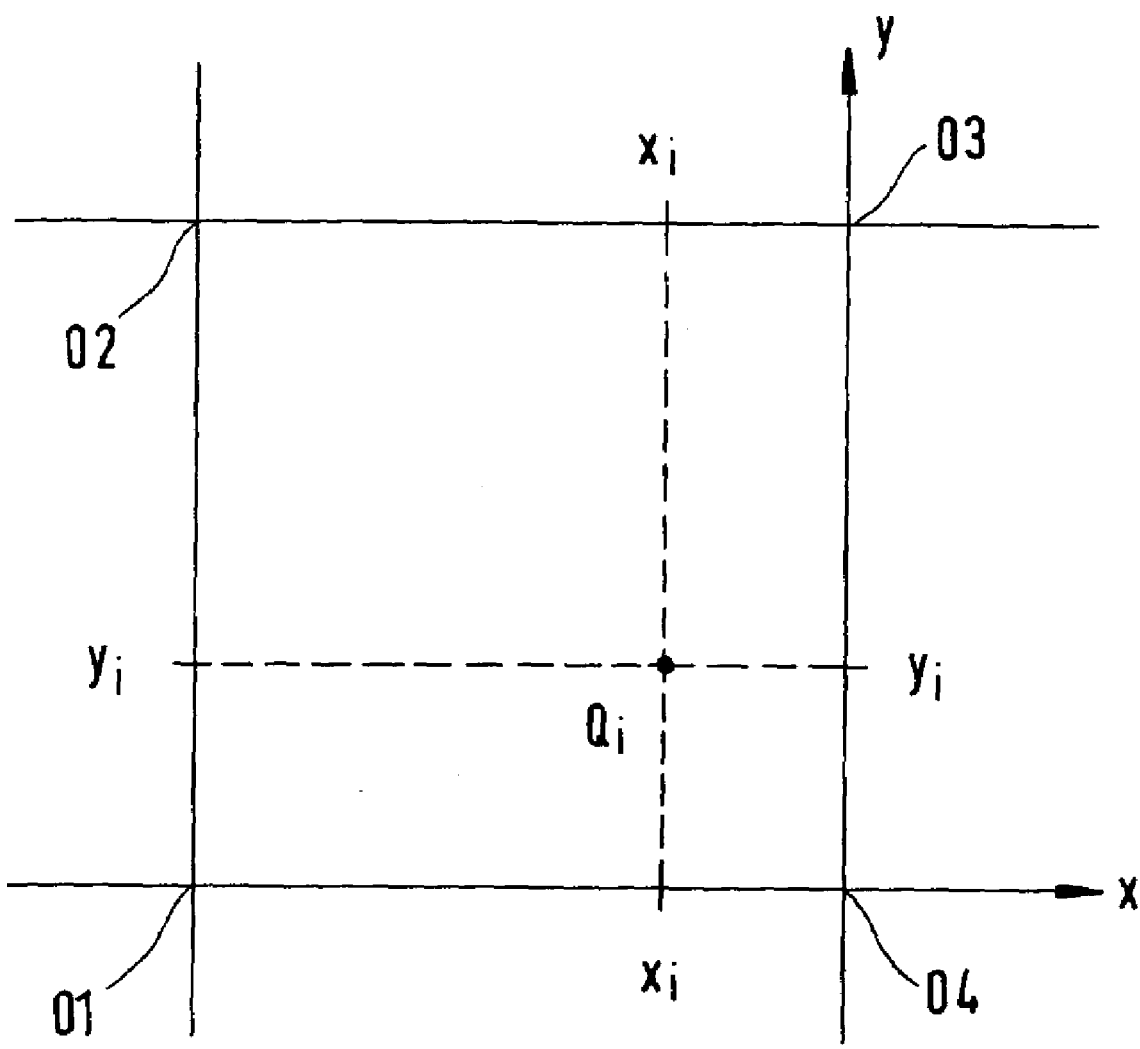
FIG. 6 is an enlargement of a section of the display unit for ascertaining the image point data from the object image points.

This is illustrated in greater detail in FIG. 6. The x and y coordinates of the bordering object image points $O_1$, $O_2$, $O_3$, $O_4$ thus come about as integer values of x, y, or are incremented thereto.

The averaging may be done, in particular, linearly, in that the image point data of the object image points are weighted corresponding to the respective distance from the respective object image points. For this, instead of the geometric, Euclidian distance apart to be calculated, a simple separated averaging may be performed over the x and y coordinates. So, for the lower line of object image points $O_1$ and $O_4$, a linear averaging may be performed as a function of the distance of the x coordinates, in which thus the data of $O_1$ are multiplied by the factor (1−(xi−int (xi))), (i.e. the distance of xi from the opposite point $O_4$), and the data of $O_4$ are correspondingly multiplied by the factor (xi−int (xi)) and they are then added. Subsequently, a corresponding linear averaging of the image point data of the upper row, having the object image points $O_2$ and $O_3$, is performed and from the values thus calculated of the upper row and the lower row a corresponding value averaged over the y coordinate is calculated, whereupon the value of the lower row is multiplied by the distance to the upper row, i.e. the factor (1−(yi−int (yi))), and the value of the upper line is multiplied by the distance to the lower line, i.e. the factor (yi int (yi)), and they are then added. In this connection, such a linear averaging maintains an antialiasing used during generation of the prestored object image points, so that, according to the present invention, subsequent filtering is not necessary.

After the ascertained image point data $R_i$, $G_i$, $B_i$, $\Box_i$ are assigned to target image $Z_i$, in the next step 21, in turn, next target image point $Z_{i+1}$ is considered.

Figure 3:
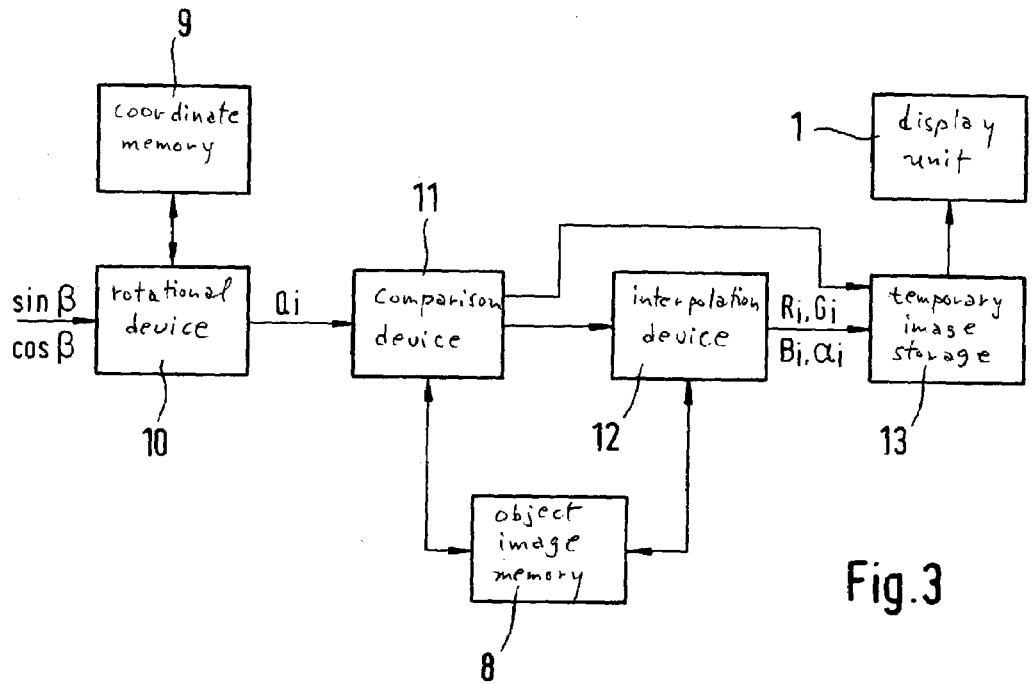
FIG. 3 is a block diagram of a device for performing the method of FIG. 2.

In the device corresponding to the method illustrated in FIG. 2, according to FIG. 3 a rotational angle β is input into rotational device 10. The sine and cosine values required for the rotation matrix are delivered by a preconnected computer. Rotational device 10 successively takes the row and column number of each target image point $Z_i$ as its whole-number coordinates, calculates source image points $Q_i$ (step 22 in FIG. 2) and passes these points on to a first comparison device 11, which compares the coordination of source image point $Q_i$ (according to step 23) to the coordinates of points A,C,D,E, which the comparison device picks up, for example, from an object image memory 8 or which the comparison device has stored as minimum and maximum values. Comparison device 11 checks whether the ascertained source image point $Q_i$ lies in object OB. If the check results in a yes determination, the coordinates of source image point $Q_i$ are passed on to an interpolation device 12, in which, according to steps 25, 26, 27 and 28, the data of target image point $Z_i$ are ascertained from the corresponding data of object image point $O_i$ stored in object image memory 8, whereupon rotational device 10 takes next target image point $Z_{i+1}$. The ascertained data R, G, B, α of target image points $Z_i$ are supplied to a temporary image storage (frame buffer) 13 for display on display unit 1.

For a pointer having 300×50 image points each having a one byte data capacity, for each primary color R, B, G as well as transparency α, only one object image memory 8 having 60 kbyte memory space is required. The smallest possible angle of rotation depends only on the calculating accuracy of the rotational algorithm or rotation device 10. For a rotation of a target image point $Z_i$ by multiplication by the 2×2 rotation matrix R, only four multiplications and two additions have to be performed. In step 23, for each target image point i=1 to n, in each case four comparisons of their coordinates to minimum and maximum values have to be performed. In determining the image point data according to steps 24, 25, 26, 27, in the maximum case, when the condition of step 23 should never be satisfied, six multiplications, six additions and three shifts are to be performed for n target image points.

Figure 5:
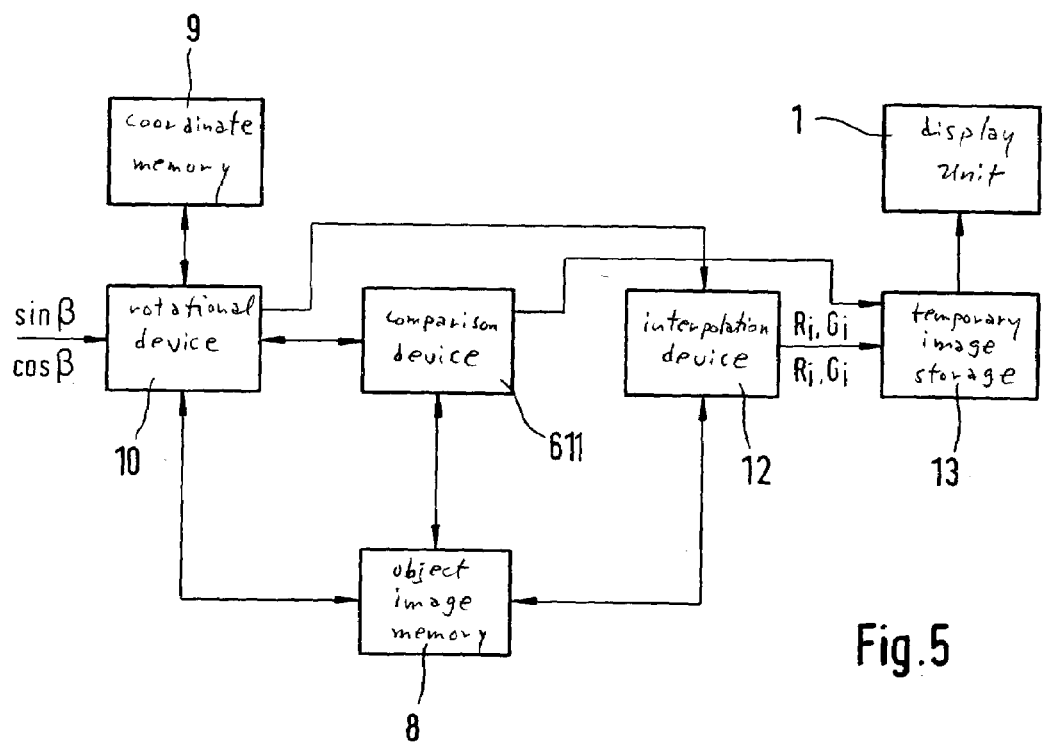
FIG. 5 is a block diagram of a device for performing the method of FIG. 4.
Figure 4:
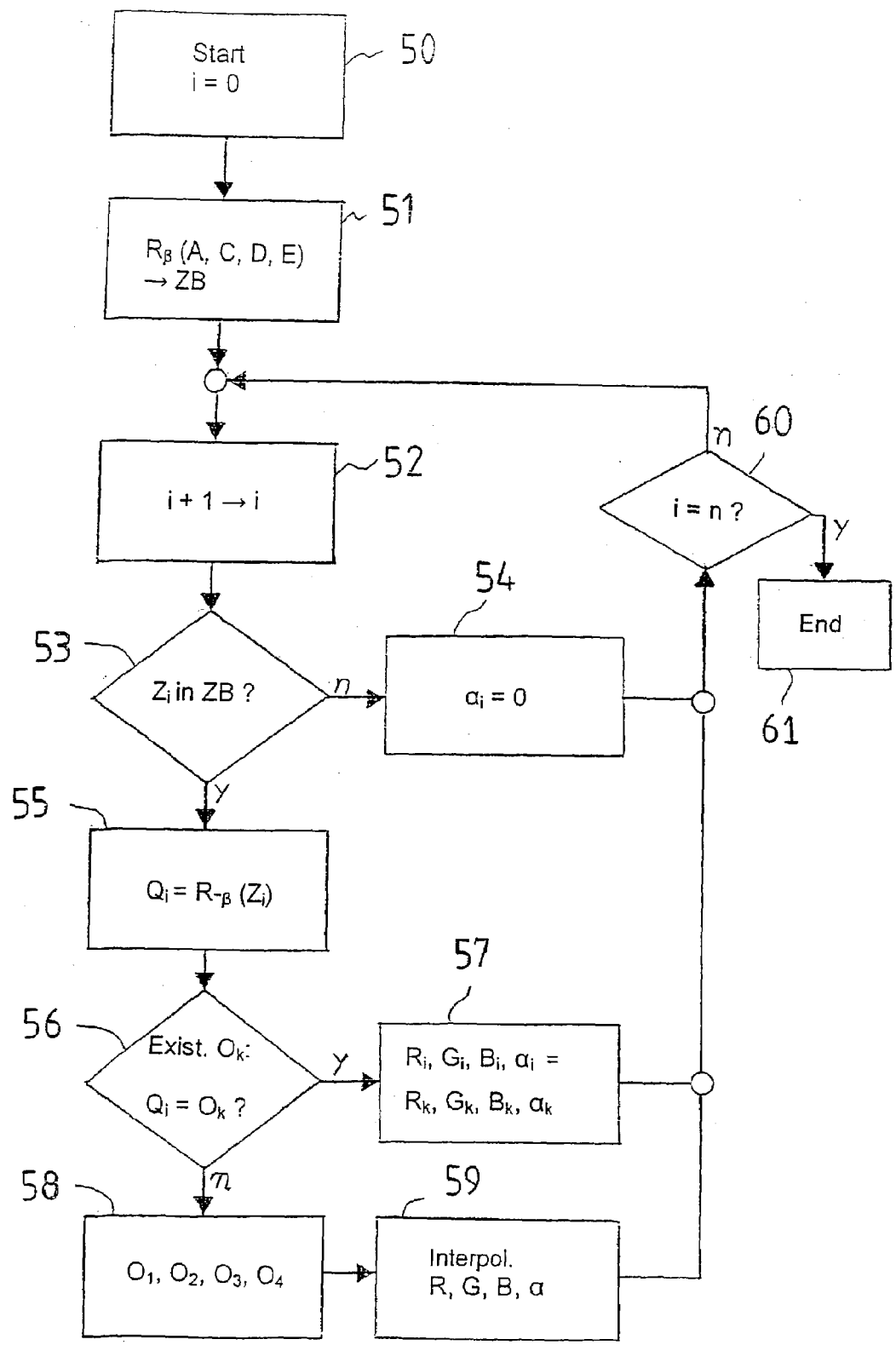
FIG. 4 is a flow diagram of a method according to a further specific exemplary embodiment of the present invention.

In the specific embodiment illustrated in FIGS. 4 and 5, the corresponding object image points $O_i$ are not determined for all target image points $Z_i$ by backwards rotation, but rather, in order to reduce calculating effort, a suitable preselection of the relevant target image points is made. For this purpose, according to FIG. 4, starting from first method step 50 by reading in and, if necessary, comparing angle of rotation β, in second method step 51, first of all, coordinates, rotated about angle of rotation β, of object image points A, C, D, E are determined. Hereby the corresponding vertices of the target image ZB are calculated. Next, in the loop formed by steps 52, 60, 61, successive target image points $Z_i$, i=1 to n are read out of coordinate memory 9 with their column and row numbers as the x and y coordinates, and it is subsequently checked in step 53 whether they lie in target image ZB. If they do not lie in ZB, in step 54 the transparency value is set to 0 (as an alternative to this, in this specific embodiment, on the other hand, the brightness value or the chromaticities could also be adjusted to the background); if they lie in ZB, in steps 55, 56, 57, 58 and 59, the data are determined in accordance with steps 22 and 25 to 28 described above.

Correspondingly, rotational device 10 in FIG. 5 receives next the coordinates of object image points A, C, D, E from object image memory 8 and respectively passes values averaged by rotation about β to a second comparison device 611 for performing decision step 53. Second comparison device 611 either sets the data to zero and passes them on directly to temporary memory 13, or causes a rotation of the target image point by rotational device 10 and the passing on of the determined source image points to interpolation device 12 for performing steps 56 to 59, and output of the calculated data to temporary image memory 13.

The interpolation device may be configured, in all specific embodiments, entirely or partially as an ASIC. Object image memory 8 may in particular be configured as a nonvolatile memory, and temporary memory 13 as a volatile memory. Devices 11, 12 and 611 may be configured as hardware or implemented as software devices.

In the specific embodiment illustrated in FIGS. 7 through 11, object image OB may also be subdivided into several object segments OS1–OS9, which may have different sizes and shapes. For row-oriented pixel processing, object segments OS1 through OS9 form, in this context, horizontally/vertically aligned rectangles, which have four object segment vertices—in FIG. 7 object segment vertices OE1,2,3,4 of first object segment OS1 are shown—have the minimum and maximum x and y coordinates of the recorded object image points. The segmentation may be undertaken according to different criteria. The size of the segments corresponds to the size of an input memory 77 of a graphics controller 72, described in greater detail below with reference to FIGS. 9 and 10, so that the number of segments is a function of the size of the source image.

Object segments OS1–OS9 are transformed separately. For this purpose, first target segment vertices ZE1,2,3,4 are formed for each object segment by transformation of object segment vertices OE1,2,3,4. Target segments ZS1–ZS9, formed by the transformation of the individual object segments—for simplicity's sake, a rotation is illustrated without specifying a scaling—in general lie, according to FIG. 8, at an angle to the x axis, and thus are not suitable for row-oriented pixel processing.

Figure 8:
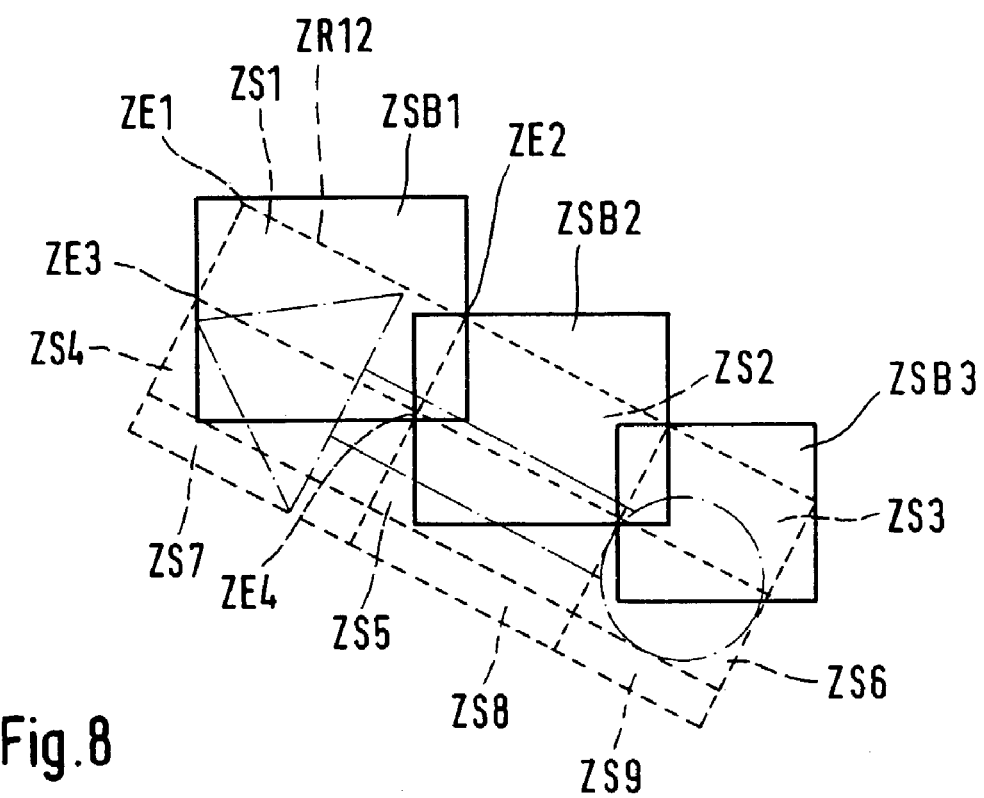
FIG. 8 is a representation of the target image to be computed from the object image of FIG. 7, showing subdivision into target segments and target segment ranges.

Therefore, according to one specific exemplary embodiment, the edges or edge regions may be parameterized, e.g. linearly parameterized, in that straight lines—in FIG. 8; for example, the straight line ZR12 between Z1 and Z2 is shown—are drawn through the target segment vertices and the image points lying inside the edges are determined.

According to one alternative specific embodiment, for each target segment ZS1–ZS9, a rectangular, horizontally/vertically aligned target segment area ZSB1 to ZSB8 is formed surrounding it. Target segment areas ZSB1 to ZSB8 are calculated pixel by pixel or by target image point, as was described in more detail in the above specific embodiment, in that for each target image point object image point data are determined by inverse transformation, i.e. backwards rotation. Since the target segment areas generally overlap, in this context, either the calculations for some target image points are made several times, or a register having precalculated target image points is installed; however, the expenditure required for this, namely to compare the coordinates of each target image point with the entries that were made in the register, will as a rule, be too high.

This specific embodiment having a segmented object image leads, in particular in the case of the rotation of longitudinal, narrow object images, such as pointers, to a considerable reduction in calculating effort, since without segmentation, in general, a very large target area is formed, containing many target image points for which no source image points are ascertained, even when the target area is limited by the transformation of the vertices. While the segment size is adjusted to the size of input memory 77 of the graphics controller, particularly of an input cache memory 77 having rapid access time, a rapid image processing may be achieved by a subsequent hardware-based computation of the inverse transformation, as described below.

Figure 9:
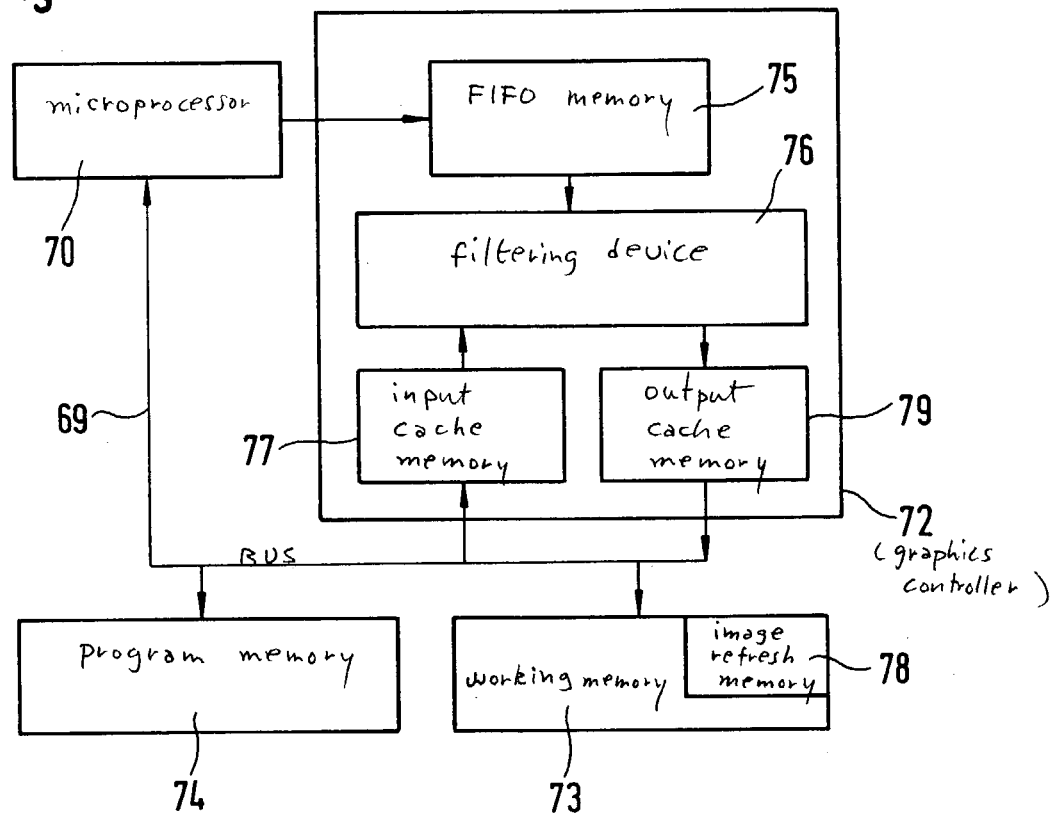
FIG. 9 is a block diagram of a device for transforming the object image of FIG. 7 to the target image of FIG. 8.

According to FIG. 9, a bus system 69 connects a microprocessor 70, a working memory (RAM) 73, a program memory 74 (e.g. a flash ROM) and graphics controller 72. In program memory 74, besides the software of the method, object image OB is also stored as a pixel map. Graphics controller 72 has a filtering device 76 for calculating the transformation and the inverse transformation as well as for an interpolation for ascertaining the target point data from the object image data, and as RAM memory regions an input cache memory 77, an output cache memory 79 and a parameter FIFO memory 75 having first-in, first-out properties. Filtering device 76 may thus correspond to rotational device 10 and interpolation device 12 of the first specific embodiment.

Figure 7:
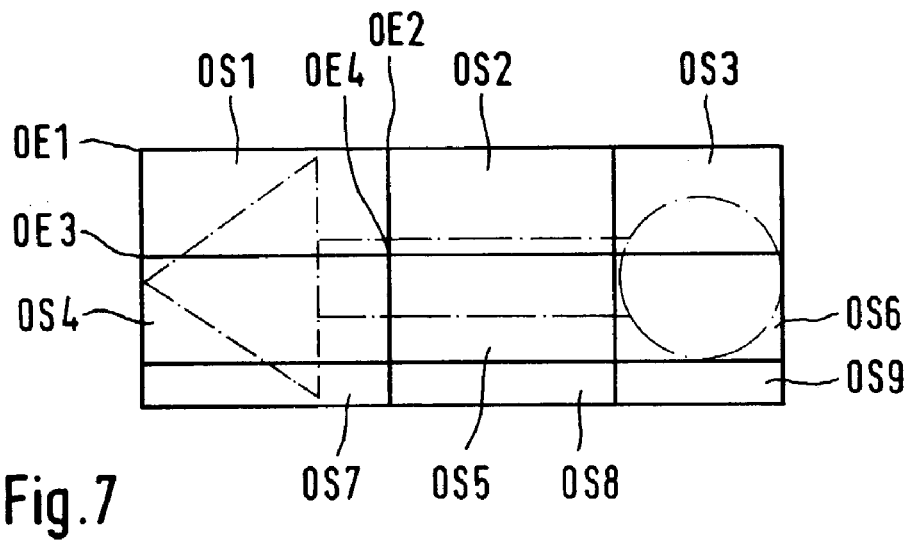
FIG. 7 is a representation of a further object image illustrating a subdivision into several object segments.
Figure 10:
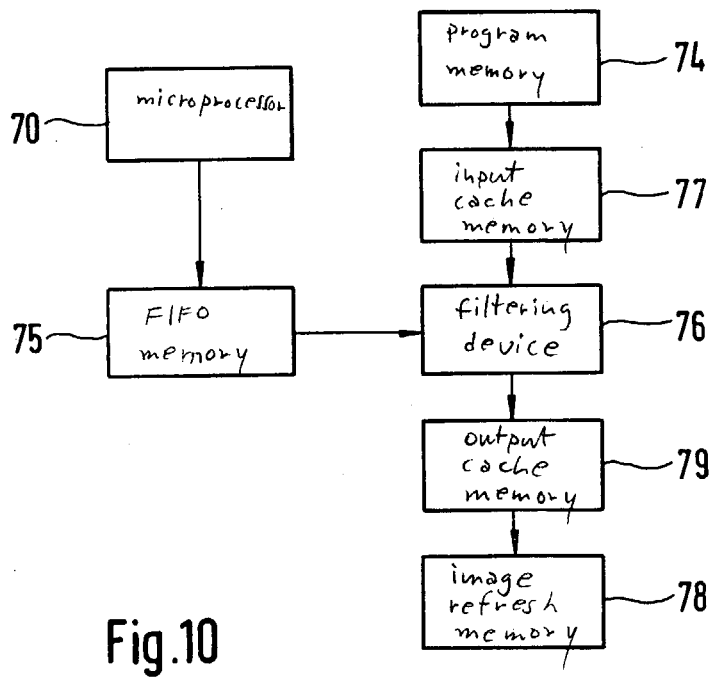
FIG. 10 is another block diagram of some of the components of the device of FIG. 9, showing a progression of the signals.
Figure 11:
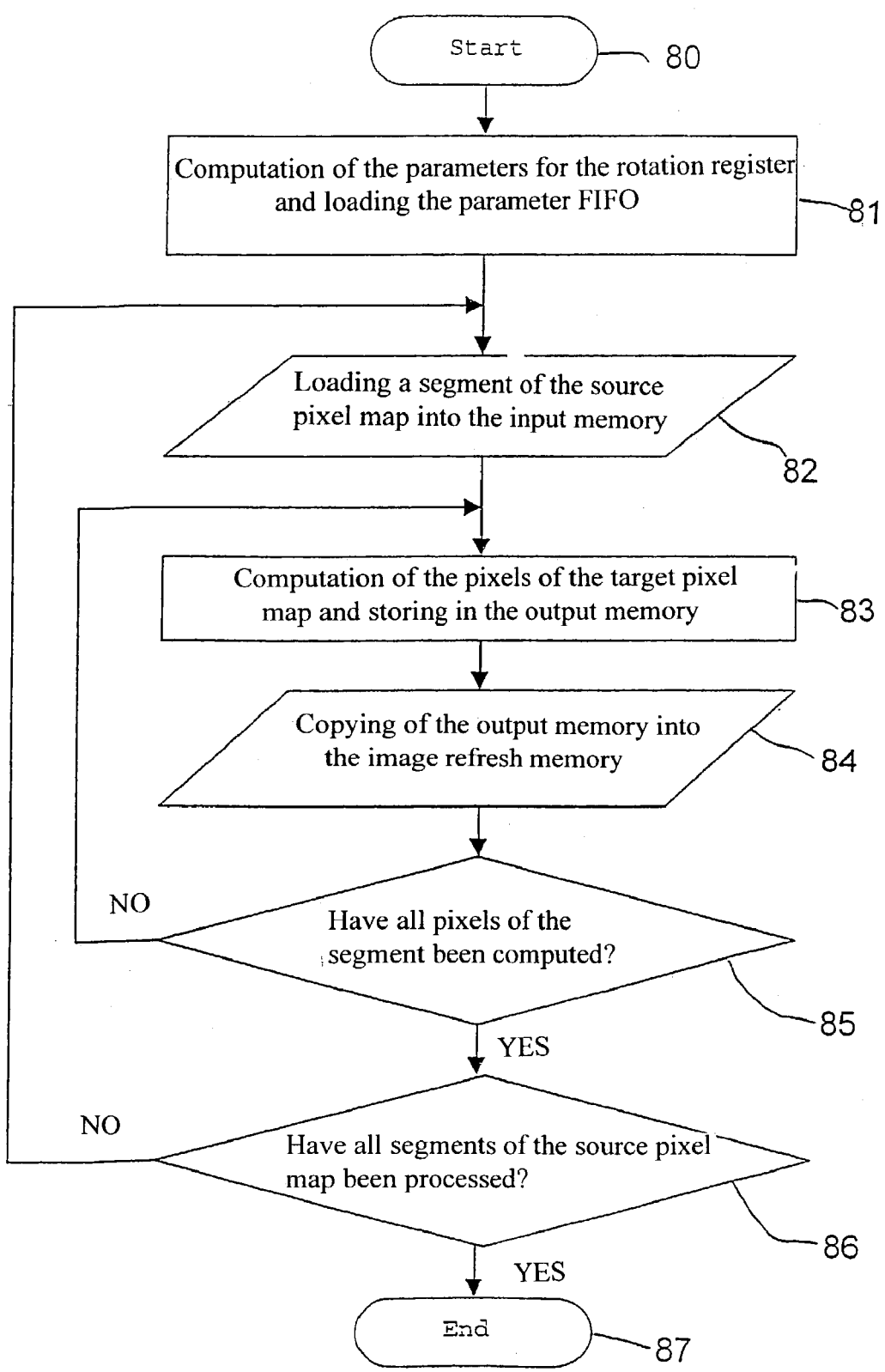
FIG. 11 is a flow diagram of the method performed using the device of FIGS. 9 and 10.

The method of operation of the device illustrated in FIG. 9 is explained based on the example of the rotation of the pointer in FIG. 7 to its position in FIG. 8, together with the illustration of FIG. 10 and the flow diagram described in FIG. 11. After the start in step 80, microprocessor 70 in step 81 calculates the object segments OS1 to 9 of object image OB to be rotated and scaled, and, with the aid of the adjustable parameter angles of rotation, scaling factor X and scaling factor Y the microprocessor 70 calculates the resulting, surrounding target segment areas ZSB1 to 8. In step 82, first object segment OS1 is loaded from program memory 74 into input cache memory 77. In order to reduce the access time, the object segments may also each be loaded ahead of time by program memory 74 into working memory 73, and in step 82 they may each be loaded by working memory 73 into input cache memory 77.

In step 83, target point data R, G, B, α are calculated by microprocessor 70 for each image point of target segment ZS1 or target segment area ZSB1. For this purpose, parameters for filtering device 76 are calculated, and stored in parameter FIFO 75. Filtering device 76 retrieves the parameters from the parameter FIFO, calculates the image points (pixels) of target image segment ZSB1 using object segments OS1 from input cache memory 77 and stores these in output cache memory 79. In step 84, the target image point data are passed by output cache memory 79 to image refresh memory 78 (frame buffer). These steps are performed according to steps 85, 86 for all target image points of all object segments. After performing these loops, the target image is loaded into image refresh memory 78, so as to be represented on display device 1, along with other representations.

For good dimensioning at relatively low costs, the input cache memory, output cache memory and parameter FIFO are configured to be as small as possible. Input cache memory 77, in this instance, determines the size of the object segments, and has, for example, 64×64 pixels at 4 bytes per pixel, and thus has 16 kbytes. Output cache memory 79 may, for example, record one row of the target segment (or of the target segment area), and thus be dimensioned by the product of row size of the input cache memory×the maximum scaling factor×4 byte/pixel=64×4×4=1 kbyte. The size of parameter FIFO 75 may be tuned in to the parameters needed for the calculation of an output row, that is, in the example described above, having four parameters per pixel, by the product of row size of the output cache memory×the scaling factor×parameters/pixel=64×4×4=1 kbyte. Filtering device 76 of graphics controller 72 is a hardware image of the transformation or the inverse transformation, in particular of a transformation including a rotation and/or scaling, but also of a more complex transformation. The calculating instructions are permanently implemented in the hardware, to achieve a maximum processing speed. In the example of rotating the arrow mentioned above, for example, a bilinear filtering of four pixels with two weighting factors may be used. Microprocessor 70 together with program memory 74 takes over the sequence control of rotation/scaling and the calculation of the required coordinates, which are stored in parameter FIFO 75, especially the subdivision of the object image or the object image-pixel database into one or more segments, the initiation of loading the individual segments into the input cache memory, the computation of the addresses of the target image pixels, the computation of the object image pixels which are drawn upon for the interpolation of the target image point data, the computation of the weighting factors or filtering factors for each target image point, the writing of the filtering parameters into the parameter FIFO and the initiation of the writing of the output cache into the working memory/image refresh memory.

According to one specific exemplary embodiment, microprocessor 70 may be configured to be on the same chip as graphics controller 72, including or excluding input cache memory 77 and output cache memory 79.

According to one specific exemplary embodiment alternative to this, input cache memory 77 is configured as a double memory. In this specific embodiment, it is possible, during the computation of a loaded object segment in the filtering device, to reload the next object segment into the free portion of input cache memory 77.

According to one further specific exemplary embodiment, output cache memory 79 is configured as a double memory. In this specific exemplary embodiment, while graphics controller 72 copies output cache memory 79 into image refresh memory 78, in filtering device 76 the next image points are calculated and stored in the free portion of output cache memory 79.

Object image OB may be segmented by graphics controller 72 before the transformation, or may be stored, already segmented in program memory 74, particularly when this is configured as a flash ROM.

According to one specific exemplary embodiment, the filtering device may calculate the target image point data, using constant weighting factors which thus do not have to be transmitted by the microprocessor, or it may calculate the weighting factors from the data on the object image points and the target image points. Furthermore, transmission of only one object image point address per target image point to the filtering device is also possible, whereupon further object image point addresses are subsequently calculated from this object image point address.

In addition, the writing of the output memory into the image refresh memory may also be initiated by the filtering device, as an alternative to the above specific embodiment.

In all the specific embodiments, different data formats of the object image point-pixel database may be supported, e.g. 8 bit alpha, 8 bit index and 256 pallet pixel, 8 bit index and 8 bit alpha and 356 pallet pixel, 8 bit red and 8 bit green and 8 bit blue and 8 bit alpha. Alternatively to the 8 bit representation of the colors and the alpha values, data formats having more or fewer bits are also conceivable, such as 5 bit red and 6 bit green and 5 bit blue.

What is claimed is:

1. A method of transforming an object image for representation on a display device having a matrix-shaped array of target image points, comprising:
    determining, for at least a portion of the target image points, source image points by an inverse transformation;
    comparing the source image points to pre-stored object image points; and
    determining, based on the comparing, target image point data of the target image points;
    wherein, during the determining of the target image point data, if a source image point coincides with an object image point, corresponding object image point data are taken as the target image point data, and if a source image point does not coincide with any of the object image points, the target image point data are determined from object image point data of adjacent object image points.

2. The method according to claim 1, wherein the object image points are stored together with object image point data in pixel map format, and wherein the target image point data are determined in pixel map format.

3. The method according to claim 1, wherein the inverse transformation includes at least one of a rotation about a negative angle of rotation, a scaling using a reciprocal of a scaling factor, and a translation.

4. The method according to claim 1, wherein the target image point data are determined by averaging the object image point data of the adjacent object image points.

5. The method according to claim 1, wherein the target image point data and object image point data each include at least one of a brightness value, a primary color value and a transparency value.

6. The method according to claim 5, wherein each of the target image point data and the object image point data have a data capacity of 1 byte.

7. The method according to claim 1, wherein the object image points are stored at a higher resolution than the target image points.

8. A method of transforming an object image for representation on a display device having a matrix-shaped array of target image points, comprising:
    determining, for at least a portion of the target image points, source image points by an inverse transformation;
    comparing the source image points to pre-stored object image points;
    determining, based on the comparing, target image point data of the target image points;
    determining a target image area by a transformation of selected object image points; and
    determining the target image points that lie in the target image area, wherein the determining of the source image points is not performed for the target image points outside the target image area.

9. The method according to claim 8, wherein the selected object image points are object image points having minimum and maximum coordinates.

10. The method according to claim 8, further comprising:
    subdividing the object image into a plurality of object segments;
    determining one of a target segment and a target segment area including the target image for each of the object segments by transformation of at least some of the object image points; and
    summing one of the target segments and the target segment areas to generate the target image.

11. The method according to claim 10, wherein the at least some of the object image points have minimum and maximum coordinates.

12. The method according to claim 10, wherein in determining the target segment areas, rectangles having horizontal and vertical alignment of rectangle sides are selected as the target segment areas.

13. The method according to claim 10, wherein the target segments are determined by:
    selecting the object image points having minimum and maximum coordinates as object segment vertices; and
    transforming the object segment vertices into target segment vertices, wherein edges of the target segments running through the target segment vertices are parameterized as straight lines;
    wherein image points lying within the target segments are determined as the target image points of the target segments.

14. The method according to claim 13, wherein the image points lying within the target segments include image points lying on edges of the target segments.

15. The method according to claim 10, further comprising:
    determining and storing parameters for the transformation in a parameter memory;
    loading the object segments into an input memory; and
    computing target point data of the target image points of one of the target segments and the target segment areas from the object image point data and the parameters.

16. The method according to claim 15, wherein the input memory is used as a double memory, an object segment being read by a filtering device from the input memory, and a subsequent object segment being stored in the input memory.

17. The method according to claims 10, further comprising:
    reading target image point data of the determined target image into an output memory;
    storing temporarily the target image point data; and
    reading the target image point data from the output memory into one of a working memory and an image refresh memory.

18. The method according to claim 17, wherein the output memory is an output cache memory.

19. The method according to claim 17, wherein the output memory is used as a double memory, the determined target image point data being input into the output memory, and the temporarily stored target image point data being output to one of the working memory and the image refresh memory.

20. The method according to claim 10, further comprising:
    storing the plurality of object segments in a program memory; and
    successively reading out the object segments from the program memory.

21. The method according to claim 20, wherein the program memory is a flash ROM.

22. The method according to claim 10, further comprising:
 reading the object image from an object image memory;
 temporarily storing the object image in a working memory; and
 reading the object image points from the working memory for the comparison to the determined source image points.

23. A device for transforming an object image for representation on a display device having a matrix-shaped array of target image points, comprising:
 an object image memory for storing object image points and object image point data;
 a transforming device for determining source image points by inverse transformation of at least one portion of the target image points; and
 a computing device for comparing the source image points to the object image points and determining target image point data from the object image point data, wherein the computing device outputs the target image point data to one of the display device and a temporary image memory of the display device, wherein the computing device comprises: a comparing device for comparing the source image points to the object image points; and an interpolating device for interpolating the target image point data from the object image point data.

24. The device according to claim 23, wherein the interpolating device is configured to interpolate linearly.

25. The device according to claim 23, wherein at least one of the transforming device and the interpolating device is configured one of fully and partially integrated in an ASIC.

26. The device according to claim 23, wherein the transforming device and the interpolating device are provided in an integrated filtering device.

27. The device according to claim 26, further comprising:
 a control unit for computing and outputting parameters of the transformation; and
 a parameter memory for receiving, temporarily storing, and outputting the parameters to the filtering device.

28. The device according to claim 27, wherein the parameter memory is a first-in-first-out memory.

29. The device according to claim 26, wherein the object image memory is a flash ROM.

30. The device according to claim 29, wherein the object image memory is configured as a part of a program memory.

31. The device according to claim 27, further comprising:
 an input memory for receiving an object segment and a portion of the object image points, and outputting the object segment to the filtering device.

32. The device according to claim 31, wherein the input memory is an input cache memory.

33. The device according to claim 31, wherein the input memory is configured as a double memory, simultaneously outputting an object segment to the filtering device and storing a following object segment.

34. The device according to claim 31, wherein the object image memory is configured to store the object image in subdivided form, the object segments.

35. The device according to claim 31, further comprising:
 an output memory for receiving the target image point data from the filtering device, and outputting the target image point data to one of a working memory and an image refresh memory.

36. The device according to claim 35, wherein the output memory is an output cache memory.

37. The device according to claim 35, wherein the output memory is configured as a double memory, for a simultaneous reception of the target image point data from the filtering device and output of the target image point data to one of the working memory and the image refresh memory.

38. The device according to claim 35, wherein the parameter memory and the filtering device are configured as a part of a graphics controller.

39. The device according to claim 38, wherein the input memory and the output memory are configured as part of a graphics controller.

40. The device according to claim 38, wherein the graphics controller, the control unit, and the object image memory are connected via a bus system.

41. The device according to claim 40, wherein a microprocessor and a working memory are connected to the bus system.

42. The device according to claim 41, further comprising:
 a working memory, wherein the object image is read out from the object image memory into the working memory, temporarily stored, and read out from the working memory by the graphics controller.

43. The device according to claim 27, wherein the filtering device and the parameter memory are in an integrated configuration.

44. The device according to claim 43, wherein the input memory and an output memory are in an integrated configuration.

45. The device according to claim 44, wherein the control unit having the filtering device and the parameter memory are configured in integrated configuration.

46. A device for transforming an object image for representation on a display device having a matrix-shaped array of target image points, comprising:
 an object image memory for storing object image points and object image point data;
 a transforming device for determining source image points by inverse transformation of at least one portion of the target image points; and
 a computing device for comparing the source image points to the object image points and determining target image point data from the object image point data, wherein the computing device outputs the target image point data to one of the display device and a temporary image memory of the display device;
 wherein the transforming device comprises:
 a rotating device for determining the source image points by rotation of at least a portion of the target image points about a negative angle of rotation.

* * * * *